United States Patent [19]

Strasser et al.

[11] Patent Number: 6,137,924
[45] Date of Patent: Oct. 24, 2000

[54] ARTICLE COMPRISING A DISPERSION COMPENSATING GRATING WITH LOW POLARIZATION MODE DISPERSION

[75] Inventors: Thomas Andrew Strasser, Warren, N.J.; Jefferson Lynn Wagener, Aberdeen, Wash.

[73] Assignee: Lucent Technologies Inc., Murray Hill, N.J.

[21] Appl. No.: 09/145,593

[22] Filed: Sep. 2, 1998

[51] Int. Cl.$^7$ ............................... G02B 6/34; G02B 6/26
[52] U.S. Cl. .................................. 385/11; 385/37
[58] Field of Search .................. 385/11, 31, 37; 359/161

[56] References Cited

U.S. PATENT DOCUMENTS

| 5,450,427 | 9/1995 | Fermann et al. | 372/18 |
| 5,515,459 | 5/1996 | Farhadiroushan | 385/12 |
| 5,701,188 | 12/1997 | Shigematsy et al. | 359/161 |

FOREIGN PATENT DOCUMENTS

| 0720031A2 | 7/1996 | European Pat. Off. | G02B 5/30 |
| 2316761 | 3/1998 | United Kingdom | G02B 6/00 |

OTHER PUBLICATIONS

K. Ennser et al., "Optimization of Apodized Linearly Chirped Fiber Gratings for Optical Communications", *IEEE of Quantum Electronics,* vol. 34, No. 5, May 1998, pp. 770–778.

*Primary Examiner*—Rodney Bovernick
*Assistant Examiner*—Juliana K. Kang
*Attorney, Agent, or Firm*—Eugen E. Pacher

[57] ABSTRACT

A dispersion compensating chirped optical fiber Bragg grating according to our invention is formed in polarization maintaining (PM) fiber having birefringence of at least $10^{-6}$, preferably $10^{-5}$ or more. Use of the PM fiber makes possible substantial cancellation of the polarization mode dispersion that typically is unavoidably present in chirped Bragg gratings for dispersion compensation.

13 Claims, 2 Drawing Sheets

ARTICLE COMPRISING A DISPERSION COMPENSATING GRATING WITH LOW POLARIZATION MODE DISPERSION

FIELD OF THE INVENTION

This invention pertains to Dispersion Compensating Gratings (DCGs), and to articles (e.g., an optical fiber communication system) that comprise a DCG.

BACKGROUND OF THE INVENTION

Dispersion Compensating Gratings (DCGs) are known. See, for instance, Ennser et al., *IEEE J. of Quantum Electronics*, Vol. 34, pp. 770–778 (1998). Briefly, a DCG is a Bragg grating that is chirped over at least a part of its length, thus providing for incident light different path lengths, and therefore different delays, as a function of wavelength. This is shown schematically in FIG. 1, wherein numeral 10 refers to a single mode optical waveguide (typically conventional silica-based optical fiber), and 11 refers to a chirped Bragg grating in the fiber. Numeral 12 refers to multi-wavelength radiation propagating in the waveguide towards the grating, and 13 and 14 refer to reflected radiation. Assuming that the grating spacing decreases as a function of distance from the input end of the grating then the wavelength of radiation 13 is greater than the wavelength of radiation 14. Since radiation 14 travels a greater distance in the grating than radiation 13, the former typically has longer delay than the latter.

As is evident from the above description, a DCG provides chromatic dispersion. The sign and amount of chromatic dispersion can be chosen at will (e.g., by choice of the chirp), and the DCG can be used to compensate chromatic dispersion in a communication system.

Although very useful in principle, prior art DCGs have a disadvantageous property that so far has prevented their wide-spread use. Specifically, prior art DCGs have relatively high polarization mode dispersion (PMD) that is substantially unpredictable.

PMD occurs when one polarization of the radiation (to be referred to as "light", regardless of wavelength) at a given wavelength has a different delay in a device than the other polarization of light at the same wavelength. "Device" is to be understood broadly, to include, for instance, conventional optical fiber.

Most devices have some PMD, and fiber itself has intrinsic PMD due, inter alia, to twist during fiber drawing and/or azimuthal asymmetry of the fiber refractive index. It is generally difficult to keep the PMD of optical fiber below about $2 \times 10^{-7}$.

By way of example, frequently encountered specifications for an optical device require less than 1 ps delay due to PMD. A 1m section of optical fiber may have a PMD of 5 fs, substantially less than the allowed maximum. However, the same length of fiber with a grating having −1000 ps/nm dispersion in the 1.55 μm wavelength region will have a PMD of over 1.5 ps, more than the permitted maximum.

The above example demonstrates that the presence of a DCG in a fiber can significantly exacerbate the intrinsic PMD of the fiber.

Twist during fiber drawing and azimuthal asymmetry are not the only PMD-generating mechanisms. Another such mechanism is UV-induced birefringence, due to non-symmetrical exposure of the optical fiber to UV during grating manufacture. UV-induced birefringence typically is about $10^{-6}$, almost double the intrinsic fiber birefringence.

The combination of uncontrolled fiber birefringence and uncontrolled UV-induced birefringence of a grating-containing device means that the PMD of the device is substantially unpredictable and cannot be easily cancelled out.

In the prior art there are attempts to deal with the PMD problem in DCGs by minimization of the birefringence in the grating. However, it is difficult to achieve birefringence less than about $10^{-6}$, and therefore difficult to achieve PMD less than about 10 ps in a DCG.

The above considerations can be quantified as follows: The polarization mode delay $\tau_{PMD}$ in a length $L_f$ of the fiber, with fiber birefringence B and fiber group velocity $V_g$, is about $$BL_f/V_s.$$

On the other hand, the polarization mode delay for light of wavelength X in a DCG wherein the penetration length before reflection is z, and wherein the dispersion is D, is about $$B[(2z/V_g)+D\lambda].$$

In the latter expression, the dispersion term $BD\lambda$ will almost always dominate the penetration depth term $2Bz/V_g$, and the PMD delay of the grating will be dominated by the dispersion term.

Clearly, a technique of reducing PMD in a DCG that does not rely on minimization of the birefringence in the DCG is needed. This application discloses such a technique.

GLOSSARY AND DEFINITIONS

Herein, "birefringence" is used in the conventional sense. A medium exhibits birefringence if the medium supports two (non-degenerate) propagation modes of light of a given wavelength, the modes having different effective refractive indices, dependent upon polarization state.

"Dispersion" herein refers to chromatic dispersion of a transmission medium. A transmission medium exhibits chromatic dispersion if the speed of light in the medium depends on the wavelength of the light. Depending on the sign of the dispersion and the chirp (wavelength composition) of a pulse of light, dispersion will either lengthen or shorten the time duration of the pulse.

A DCG herein has "adiabatically increasing strength" if the amplitude of the refractive index variation of the grating increases relatively slowly from the input edge of the grating so as to substantially apodize the DCG. See, for instance, the above-cited paper by Ennser et al.

By "polarization maintaining" (PM) fiber we mean herein a birefringent fiber which supports two well defined orthogonal propagation modes of light whose effective refractive indices differ by $10^{-6}$ or more.

SUMMARY OF THE INVENTION

Broadly speaking, the invention is embodied in an article that comprises a DCG having relatively low PMD, as compared to prior art DCGs.

More specifically, the article comprises a length of optical fiber and a chirped Bragg grating (the DCG) in the fiber. Significantly, the optical fiber comprises a polarization-maintaining (PM) fiber having predetermined first and second directions of polarization, with birefringence of $10^{-6}$ or more, preferably $10^{-5}$ or more. In a preferred embodiment of the invention the article further comprises a PMD compensator selected to substantially cancel the PMD of the DCG. In a further preferred embodiment, the DCG has adiabatically varying strength.

The article that comprises the DCG exemplarily is a dispersion compensating device (typically packaged in a housing), or an optical fiber communication system having one or more DCGs disposed in the optical signal transmission path between transmitter and receiver.

The drawings are not to scale or in proportion.

DETAILED DESCRIPTION

Figure 1:
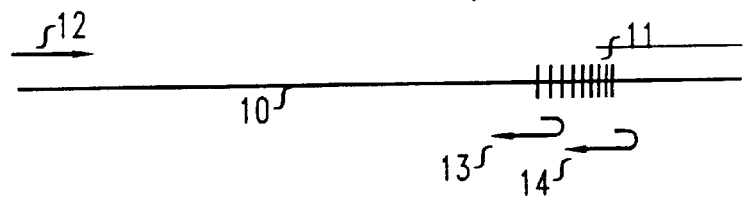
FIG. 1 schematically depicts a prior art DCG.
Figure 2:
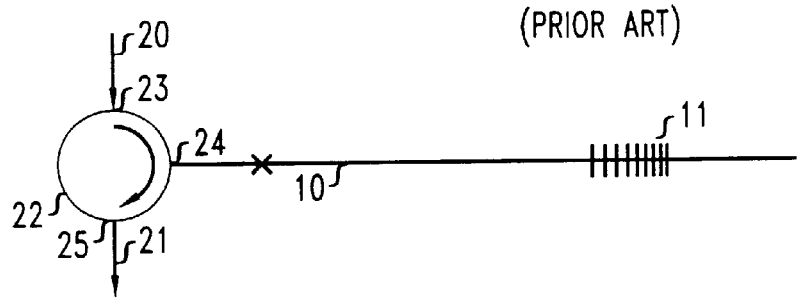
FIG. 2 shows a relevant portion of a prior art communication system with a DCG.

FIG. 2 schematically depicts a portion of a prior art optical fiber communication system with dispersion compensation by means of a DCG 11 in conventional optical fiber 10. Input light 20 enters input port 23 of circulator 22, exits circulator port 24, propagates towards DCG 11 where it is reflected, enters circulator port 24, and exits the circulator at port 25. In the ideal case DCG 11 is selected such that output radiation 21 is dispersion compensated, with minimal PMD. In practice, however, minimal PMD is difficult to achieve, creating a need for a different approach.

A circulator is a particular member of a class of devices, designated "directional transfer devices", that serve to separate light traveling in one direction from light traveling in the opposite direction. Another directional transfer device that could be used in the practice of the invention is a coupler.

Embodiments of the instant invention depart from prior art practice by using an optical fiber having a predetermined first and second direction of polarization, with relatively high birefringence, and by, typically, adding an appropriate amount of PMD in front of the DCG.

Optical fiber with predetermined first and second polarization direction and with relatively high birefringence are generally referred to as polarization-maintaining (PM) fiber and are well known. Briefly, the birefringence of the PM fiber defines an axis system, such that light that is launched into the PM fiber with polarization along one of the axes is maintained polarized along that axis.

The required birefringence of the PM fiber is determined, inter alia, by the previously discussed UV-induced birefringence and the amount of birefringence introduced during packaging of the device, and should be significantly larger than both. In many cases, the lower limit of useful birefringence is $10^{-6}$, and the birefringence preferably is $10^{-5}$ or more. Optical fiber with B>$10^{-3}$ typically is difficult to manufacture, and a grating in a fiber with B>$10^{-3}$ can waste up to about 1 nm grating bandwidth. Thus, the upper limit of useful birefringence typically is about $10^{-3}$.

A significant feature of an article according to the invention is provision of the DCG in high-birefringence (PM) fiber. Since the PMD in the grating occurs on well defined axes and with a well defined value, it is possible to compensate for the PMD. This situation is quantified by the following expression, where L is the length of PM fiber before the grating, and all other terms are as previously specified.

$$\tau_{PMD} \sim B[2(z \pm L)V_g^{-1} + D\lambda]$$

In order to achieve the desired reduction of PMD, L is selected such that $D\lambda$ is of substantially equal magnitude and opposite sign as $2LV_g^{-1}$.

Thus, light propagating through the length L of PM fiber experiences an amount X of PMD. The light then reflects off the DCG, in the process experiencing an amount $-2X$ of PMD, bringing the total PMD to $-X$. As the light propagates back through the length L of PM fiber, the light experiences another amount X of PMD, resulting in zero net PMD.

In the above expression, the sign of L was chosen to be the opposite of the sign of D, so that cancellation can be effected. Thus, if the DCG has negative dispersion then L is added to z, indicating that there is no need for a rotation of axes of the PM fiber before the grating. On the other hand, if the grating has positive dispersion then L is subtracted from z, indicative of the need for a 90 degree rotation of the axes of the PM fiber before the grating. Such rotation is readily accomplished, e.g., by means of a splice or aligned APC (angled physical contact) fiber connector before the grating.

Cancellation of the grating dispersion term $D\lambda$ by the PM fiber term $2L/V_g$ leaves a, typically small, residue of PMD that is proportional to the penetration depth of the light in the DCG. The magnitude of this residual PMD can readily be made less than about 0.1 ps, significantly less than typical requirements of current specifications.

Figure 3:
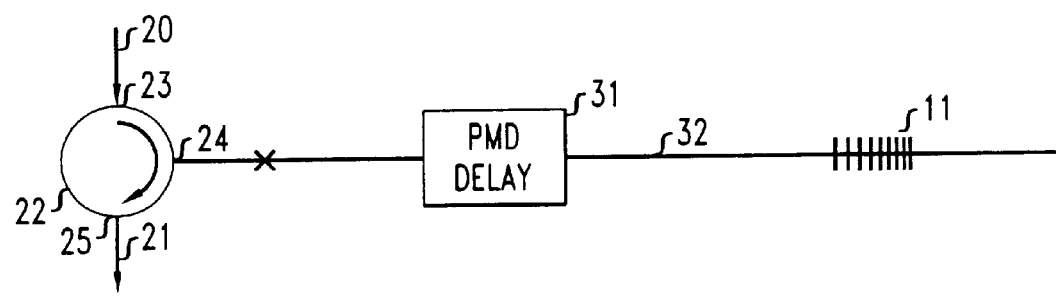
FIGS. 3–5 schematically show exemplary embodiments of the invention.

FIG. 3 schematically depicts an exemplary article according to the invention, wherein numeral 32 refers to PM fiber. The "PMD DELAY" 31 typically comprises a predetermined length of the PM fiber, selected to offset the PMD of the DCG, as discussed above.

Figure 6:
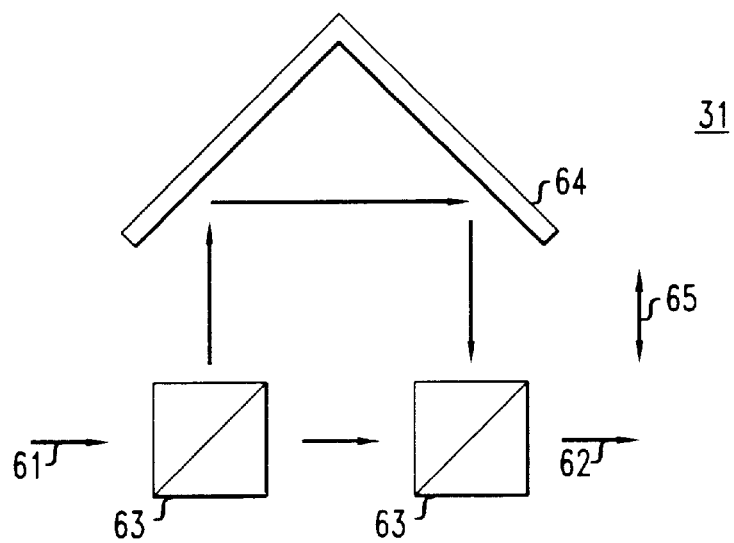
FIG. 6 schematically depicts bulk optic PMD delay means.

Alternatively, in a non-preferred embodiment, PMD delay 31 comprises conventional bulk optical means to provide the desired offset. FIG. 6 schematically shows exemplary bulk optic PMD delay means 31, wherein numeral 61 refers to light from the circulator or other directional transfer device, 62 refers to light that is to travel to the DCG, numerals 63 refer to polarization splitting/combining cubes, and 64 refers to a movable mirror. As will be readily understood, the two polarizations of the light travel different path lengths before being recombined in a polarization combiner. Not shown are some conventional components such as a beam expander to go from optical fiber to bulk optics. The output of the polarization combiner is launched into the DCG located in the PM fiber. The desired PMD is attained by selection of the path length difference between the two polarizations, i.e., by selection of the position of movable mirror 64, as indicated by double-headed arrow 65.

Figure 4:
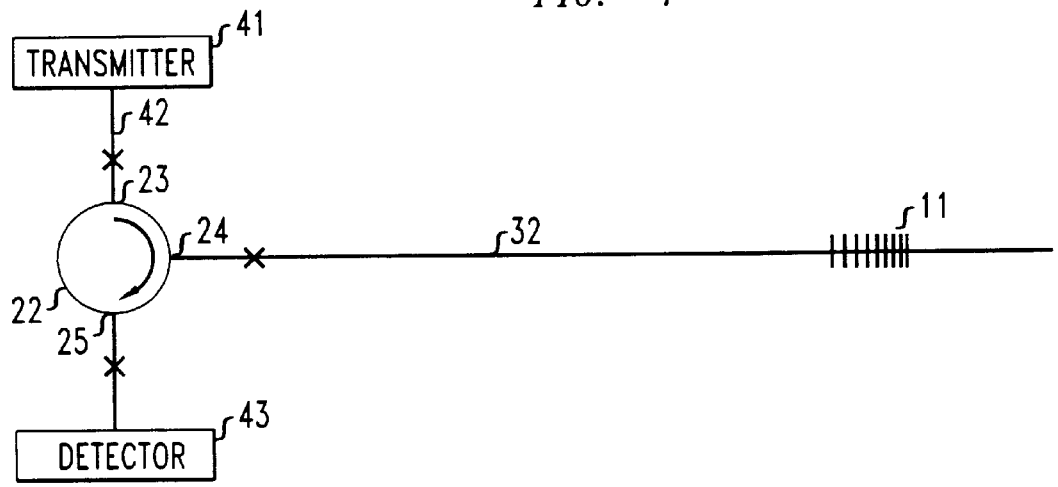

FIG. 4 schematically shows an exemplary optical fiber communication system 40 according to the invention. Transmitter 41 and detector 43 are conventional, and are signal-transmissively connected by an optical fiber transmission path that comprises a length (e.g., about 50 km) of optical transmission fiber 42 that introduces dispersion into the system. At a convenient location (e.g., just upstream of the detector) is disposed circulator 22. Light of wavelength λ (e.g., 1550 nm) enters port 23 of the circulator, exits the circulator at port 24, propagates through PM fiber 32 to DCG 11, is reflected by the grating, propagates back to port 24 through the PM fiber, enters the circulator through port 24, exits the circulator at port 25 and is detected by detector 43. A directional transfer device other than a circulator could also be used.

Figure 5:
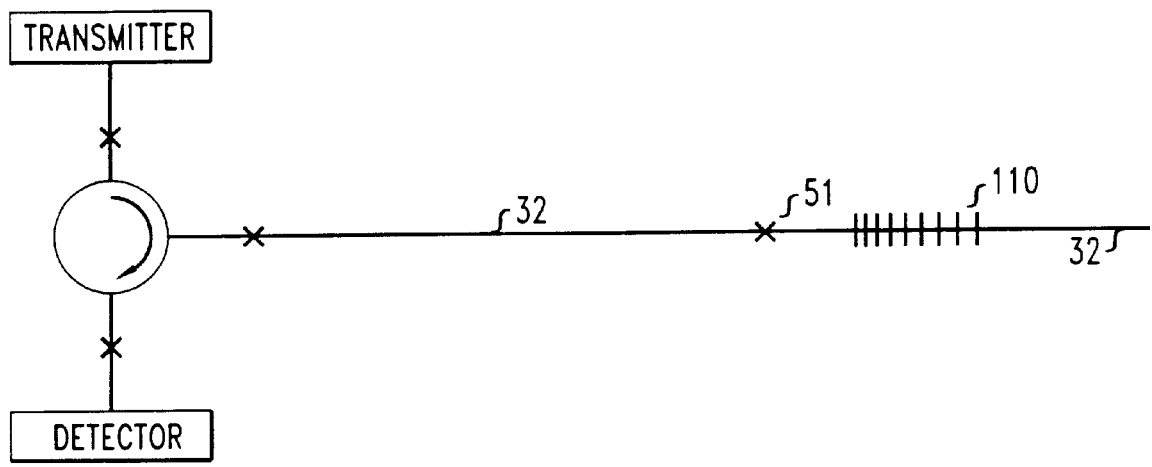

FIG. 5 schematically shows a further exemplary optical fiber communication system according to the invention. The system of FIG. 5 is substantially like the system of FIG. 4, except that the former has a DCG 110 with positive dispersion (i.e., a grating wherein shorter wavelengths are reflected before longer wavelengths) whereas the latter has a grating with negative dispersion, and the former further comprises a 90 degree splice 51 that interchanges the two polarization axes of the PM fiber. The splice is placed just before the grating. In preferred embodiments the DCGs are apodized to provide gratings with adiabatically varying strength. A low reflection PM-APC fiber connector could be used to interchange the polarization directions.

EXAMPLE 1

In an optical fiber communication system, a conventional transmitter is connected to a conventional receiver by 60 km of standard 5D® fiber. The fiber link has nominal chromatic dispersion of 1020 ps/nm in the 1550 nm band. A chirped Bragg grating is used to compensate the chromatic dispersion.

A single mode PM fiber (having intrinsic fiber birefringence of value $10^{-5}$, and a group velocity of $2.05 \times 10^{-4}$ m/ps), with Ge-doped core, is loaded with deuterium in conventional fashion, and a chirped Bragg grating is written into the fiber core by UV exposure through a phase grating. The grating is centered at wavelength 1550 nm, has length 8 cm and a chirp rate −10.455 cm/nm. The grating is disposed in the PM fiber such that the fiber length from the grating center to the end of the PM fiber is 162 m.

In an arrangement substantially as shown in FIG. 4, 1550 nm light from the transmitter enters the first port of a three-port circulator. The light exits the second port and enters the PM fiber. The light propagates to the grating, is reflected by the grating, propagates back to the second circulator port, enters the second port and exits the third circulator port.

The chirped grating is designed to provide −1020 ps/nm dispersion for light of wavelength 1550 nm, and thus compensates for the chromatic dispersion of the 60 km of 5D® fiber. The use of the PM fiber for both the grating and the 162 m fiber between the grating and the circulator makes the overall PMD from the DCG less than about 10 fs, and the arrangement thus substantially eliminates signal dispersion in the system, with minimal accumulated PMD.

EXAMPLE 2

An optical communication system substantially as described above, except that the DCG has adiabatically varying strength.

EXAMPLE 3

System substantially as described in Example 1 except that the DCG has positive dispersion, and the PM fiber of the DCG is rotated 90° with respect to the PM fiber that connects the grating and the circulator.

The invention claimed is:

1. An article comprising a dispersion compensator for compensating a chromatic dispersion in an optical fiber communication system wherein the dispersion compensator comprises
   a) a directional transfer device having a first, second and third port, said first port being an input port, and said third port being an output port;
   b) a polarization maintaining optical fiber having a predetermined first and second axis of polarization, with an intrinsic fiber birefringence of $10^{-6}$ or more, the polarization maintaining optical fiber being signal-transmissively connected to the second port of the directional transfer device; and
   c) a chirped Bragg grating disposed in said polarization maintaining optical fiber; CHARACTERIZED IN THAT
   d) the chirped Bragg grating is spaced from said second port of the directional transfer device, the length L of polarization maintaining optical fiber between said second port and said chirped Bragg grating being selected such that, for radiation of wavelength $\lambda$, the chromatic dispersion at the third port is substantially less than the corresponding chromatic dispersion at the first port, with L being furthermore selected such that $2(z \pm L)V_g$ is at least approximately equal to $D\lambda$, where z is a penetration depth of the signal radiation $\lambda$ into the chirped Bragg grating, and $V_g$ is a group velocity of the signal radiation in the polarization maintaining fiber, where L is added to z if a grating dispersion is negative, and L is subtracted from z if the grating dispersion is positive, and where D is a dispersion in the chirped Bragg grating.

2. Article according to claim 1, wherein said intrinsic fiber birefringence is between $10^{-3}$ and $10^{-5}$.

3. Article according to claim 1, further comprising a PMD delay device connected with said polarization-maintaining fiber.

4. Article according to claim 3, wherein the PMD delay device comprises at least a portion of said polarization maintaining fiber.

5. Article according to claim 1, wherein said chirped Bragg grating is apodized to exhibit adiabatically varying grating strength.

6. Article according to claim 1, further comprising a transmitter and a receiver connected to the transmitter by an optical fiber transmission path, with said directional transfer device disposed in said transmission path.

7. Article according to claim 1, wherein said directional transfer device is a circulator or an optical fiber coupler.

8. Article according to claim 1, wherein said polarization maintaining fiber between the second port of the directional transfer device and the chirped Bragg grating comprises a first and a second length of polarization maintaining fiber, disposed such that, at a connection between said first and second length, the first axis of polarization of the first length is substantially parallel with the second axis of polarization of the second length, the second axis of polarization of the first length is substantially parallel with the first axis of polarization of the second length, and L is subtracted from z.

9. Article according to claim 1, wherein $\lambda$ is about 1.5 $\mu$m.

10. Article according to claim 1, wherein said dispersion compensator comprises a single polarization maintaining optical fiber with a chirped Bragg grating disposed therein.

11. Article according to claim 10, wherein said single polarization maintaining optical fiber with chirped Bragg grating disposed therein is connected to said second port without an intervening non-reciprocal element.

12. Article according to claim 1, wherein a PMD delay means between the second port and the chirped Bragg grating comprises a predetermined length of said polarization maintaining optical fiber.

13. Article according to claim 1, wherein a PMD delay means between the second port and the chirped Bragg grating comprises a mirror and two polarization splitting/combining cubes.

* * * * *